(No Model.)

L. YAKEL.
TIRE FOR WAGON WHEELS.

No. 254,422. Patented Feb. 28, 1882.

Witnesses:
William W. Mortimer
E. D. Gork

Inventor:
Levi Yakel
per
F. A. Lehmann,
Atty

United States Patent Office.

LEVI YAKEL, OF ALLEGHENY, PENNSYLVANIA.

TIRE FOR WAGON-WHEELS.

SPECIFICATION forming part of Letters Patent No. 254,422, dated February 28, 1882.

Application filed November 19, 1881. (No model.)

*To all whom it may concern:*

Be it known that I, LEVI YAKEL, a citizen of the United States of America, residing at Allegheny, in the county of Allegheny and State of Pennsylvania, have invented certain new and useful Improvements in Tires for Wagon-Wheels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an improvement in tires for wagon-wheels, and for wheels on other vehicles; and it consists in making them of a form to not only strengthen and protect the outer rim of the felly, but also its sides, and in applying means to contract or expand the tire without removing it from the wheel, as will be more fully described hereinafter.

The wheels on vehicles of every description generally are the parts first worn out, owing to many weak points in their construction. The fellies are weakened by the holes for the spokes to enter, and by the bolts that hold the tire in place, which also causes them to split. The spokes inserted in the felly, provided with shoulders upon which frequently rests the whole weight of the vehicle, are soon worn away by constant jarring. The change from dry to wet, and vice versa, causes the wood to expand and contract. Hence the tires have often to be cut and shrunk to hold the wheels together, and should a spoke become loose or broken the wheel has to be taken to pieces in order to make the repairs. These defects I avoid by inclosing the felly in the metal flanges of the tire, thereby protecting it against injury from without and contracting or expanding it at pleasure to make all the necessary repairs.

The accompanying drawings represent my invention.

Figure 1:
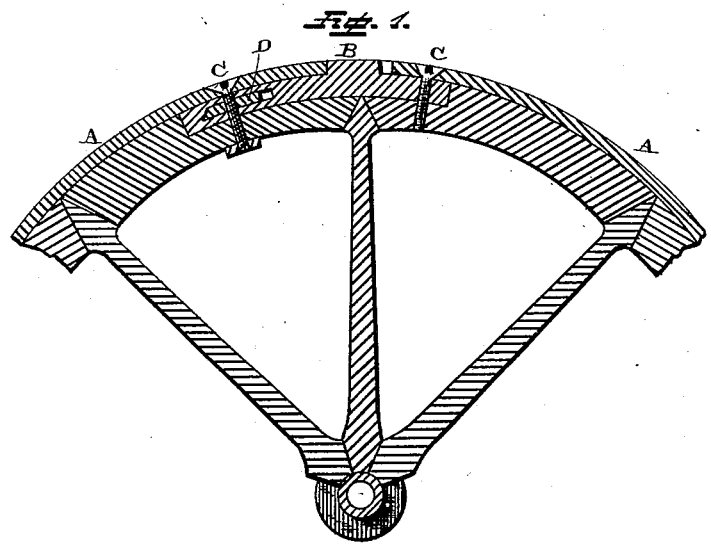
Figure 2:
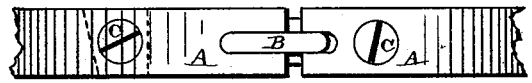
Figure 3:
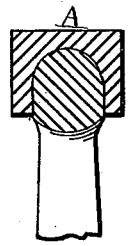

Figure 1 is a vertical section of my invention, and Figs. 2 and 3 are detail views of the same.

The tire A, whether of steel or iron, is made in one or more pieces, and formed to cover the felly on top and clasp it at both sides by having its edges turned down at right angles of a width with the sides of the felly. The inside or cavity in the tire, which holds the felly, is in the form of a U, whereby the outer angles are made thicker than the other parts. This increased thickness is to make the tire last longer, since it is first worn off at its edges.

In the ends of the pieces composing the tire, if made of more than one, are cavities in which stays B are placed, secured by screws C inserted from the outside to join or bind the pieces together. At one of these joints, however, only one end of the stay is fastened by a screw. The other end, somewhat longer than the secure one, is slotted, and corresponding slots are made through both sides of the tire to allow a wedge, D, to enter both the stay and the tire. By means of this wedge the ends of the tire may be drawn more or less close together, and with it all parts of the wheel; or by withdrawing the wedge the tire may be loosened to permit the removal or replacing of spokes. The wedge is held in place by a screw-bolt introduced from the outside of the tire, and secured by a nut under the felly.

To prevent the ends of the tire from sliding sidewise, an upward projection on the stay enters a longitudinal slot divided by the ends of the tire; but the ends of the tire may be made to lock each other by any other device, such as shaping one end like a V and the other with an opening to receive it.

The outer ends of the spokes that enter into the felly are arrow or V shaped, and somewhat enlarged near the end. The felly is composed of sections that extend from the point on one spoke to another. Their ends are so beveled that when put together they leave a V-shaped opening between them to be occupied by the sharpened end of a spoke. The flanges on the tire hold in place and protect the felly and spokes, and should either of them become loose the driving of the wedge for tightening the tire will remedy the defect, and by withdrawing the wedge access will be given to all parts of the wheel, since the tire can then be removed.

Having thus described my invention, I claim—

1. The combination of the tire, having its edges turned down over the sides of the felly and slots made through its free end, with the slotted stay B, to which one end of the tire is rigidly fastened, the wedge D, and screws C, substantially as set forth.

2. A tire for vehicle-wheels, by the contraction of which the sections of the felly are drawn together and the outer ends of the spokes held between the sections secured by the downward-bent edges of the tire, substantially as shown and described.

In testimony whereof I affix my signature in presence of two witnesses.

LEVI YAKEL.

Witnesses:
LOUIS MOESER,
PAUL HOLL.